United States Patent
Frink et al.

(10) Patent No.: US 9,461,925 B1
(45) Date of Patent: Oct. 4, 2016

(54) METHODS AND APPARATUS FOR IMPLEMENTING DYNAMIC RATE CONTROLLERS USING LINKED LIST OF RATE PROGRAMS

(71) Applicant: Juniper Networks, Inc., Sunnyvale, CA (US)

(72) Inventors: Craig R. Frink, Chelmsford, MA (US); Monte Becker, Northboro, MA (US); Nayan S. Patel, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 262 days.

(21) Appl. No.: 14/014,849

(22) Filed: Aug. 30, 2013

(51) Int. Cl.
G06F 15/16 (2006.01)
H04L 12/825 (2013.01)

(52) U.S. Cl.
CPC .................... H04L 47/25 (2013.01)

(58) Field of Classification Search
CPC ....... H04L 47/10; H04L 47/25; H04W 24/06
USPC ......................................................... 709/223
See application file for complete search history.

(56) References Cited

U.S. PATENT DOCUMENTS

| | | | |
|---|---|---|---|
| 2004/0141504 A1* | 7/2004 | Blanc et al. ................. | 370/394 |
| 2009/0122707 A1* | 5/2009 | Weinman ..................... | 370/237 |
| 2011/0040830 A1* | 2/2011 | Kumar et al. ................ | 709/203 |

* cited by examiner

Primary Examiner — Oleg Survillo
Assistant Examiner — Tan Doan
(74) Attorney, Agent, or Firm — Cooley LLP (57) ABSTRACT

In some embodiments, an apparatus includes a rate module implemented in at least one of a memory or a processing device that can be operatively coupled to a set of rate counters. Each rate counter is associated with a different network device associated with a level within the hierarchy of a network. The rate module can receive from a schedule module a signal to begin execution of a first page of a first rate program and can send during a first time period transmission credits to a first subset of rate counters. The rate module can send during a second time period transmission credits to a second subset of rate counters based on the execution of a page of a second rate program where the priority of the second rate program is no lower than a priority of the first rate program.

19 Claims, 6 Drawing Sheets

METHODS AND APPARATUS FOR IMPLEMENTING DYNAMIC RATE CONTROLLERS USING LINKED LIST OF RATE PROGRAMS

BACKGROUND

Some embodiments described herein relate generally to methods and apparatus for implementing a dynamic rate controller in a computer network. In particular, but not by way of limitation, some of the embodiments described herein relate to methods and apparatus for implementing a dynamic rate controller by using linked list pages of rate programs with dynamic scaling of transmission credits and clip values.

A rate controller can distribute guaranteed (G) transmission credits and maximum (M) transmission credits to different network nodes (or devices) and queues associated within different levels in the hierarchy of a network. Rate controllers can determine the transmission rate of data units within a network based on the number of transmission credits provided to each network-node rate counter and queue rate counter in the network and the frequency of each rate update event. Additionally, a clip value can be computed by the rate controller for every node and/or queue in the network and the clip values can be associated by the rate controller to their respective nodes and/or queues in the network. A clip value is associated with each rate update cycle and can limit the accumulation of transmission credits across multiple rate update cycles (e.g., limit data unit burst size). A desirable property of a rate controller is the ability to provide dynamically scaling rate update periods as a function of a dynamically changing size of nodes and queues in a network to minimize jitter and latency in the network. Providing dynamically scaling rate update capability is, however, non-trivial as changes in the rate update period typically involves the rate "instructions" in a rate program to change both the number of transmission credits and the clip value assigned to each node and queue in the network.

Known methods of implementing rate controllers include storing the rate update instructions of a rate program in a memory of a network node (e.g., a router) that is executed by a processor in a single sequence. In such known methods, the rate update period is typically set large enough to accommodate the maximum number of rate update instructions used in the sequence for the largest network configuration. As the configuration of a network changes, distribution of the rate update instructions in a rate program and calculation of transmission credit values and clip values for each node and queue added to the network is performed in every rate update cycle, a process that is computationally intensive. Additionally, in some other known methods, often two rate programs are maintained in the memory of a network node where a first rate program is actively executed and a second rate program is actively rewritten by adding or removing rate update instructions to reflect the network configuration changes. Once the second rate program is updated, it is swapped with the first rate program, typically in a controlled fashion, at the end of a rate update cycle. Such methods of storing multiple rate programs significantly increase the computational resources and memory usage of a network.

Accordingly, a need exists for methods and apparatus for implementing a dynamic rate controller that does not include additional memory space beyond what is used for the rate update instructions and that does not involve added computational resources used for calculating new transmission credit values and clip values in each rate update cycle.

SUMMARY

In some embodiments, an apparatus includes a rate module implemented in at least one of a memory or a processing device that can be operatively coupled to a set of rate counters. In such embodiments, each rate counter from the set of rate counters is associated with a different network device from a set of network devices associated with a level from a set of levels within the hierarchy of a network. In such embodiments, the rate module can receive from a schedule module a signal to begin execution of a first page of a first rate program. The rate module can send during a first time period and in response to the signal, transmission credits to a first subset of rate counters from the set of rate counters based on execution of the first page of the first rate program. The rate module can send during a second time period after the first time period and prior to executing a second page of the first rate program transmission credits to a second subset of rate counters from the set of rate counters based on the execution of a page of a second rate program. In such embodiments, the priority of the second rate program is no lower than a priority of the first rate program and the first subset of rate counters is mutually exclusive from the second subset of rate counters.

DETAILED DESCRIPTION

In some embodiments, an apparatus includes a rate module implemented in at least one of a memory or a processing device that can be operatively coupled to a set of rate counters. In such embodiments, each rate counter from the set of rate counters is associated with a different network device from a set of network devices associated with a level from a set of levels within the hierarchy of a network. In such embodiments, the rate module can receive from a schedule module a signal to begin execution of a first page of a first rate program. The rate module can send during a first time period and in response to the signal, transmission credits to a first subset of rate counters from the set of rate counters based on execution of the first page of the first rate program. The rate module can send during a second time period after the first time period and prior to executing a second page of the first rate program transmission credits to a second subset of rate counters from the set of rate counters based on the execution of a page of a second rate program. In such embodiments, the priority of the second rate program is no lower than a priority of the first rate program and the first subset of rate counters is mutually exclusive from the second subset of rate counters.

In some embodiments, a non-transitory processor-readable medium includes code to cause a processor to receive, from a schedule module, and at a rate module a signal to begin iterative execution of a first rate program where the first rate program includes a first set of pages. In such embodiments, the rate module is operatively coupled to a set of rate counters where each rate counter from the set of rate counters is associated with a network device from a set of network devices. The code includes code to cause the processor to send, based on the first rate program and in response to the signal, a first number of transmission credits to each rate counter from the set of rate counters per execution iteration of the first rate program during a first time period. The code also includes code to cause the processor to modify, after the first time period and before a second time period, the first rate program to produce a second rate program including a first set of pages and a second set of pages where the second set of pages is mutually exclusive from the first set of pages. The code further includes code to cause the processor to send, based on the second rate program, a second number of transmission credits to each rate counter from the set of rate counters per execution iteration of the second rate program where the first number of transmission credits is different from the second number of transmission credits.

In some embodiments, an apparatus includes a rate module implemented in at least one of a memory or a processing device that can be operatively coupled to a set of rate counters, where each rate counter from the set of rate counters is associated with a different network device from a set of network devices. In such embodiments, the rate module can receive, from a schedule module, a signal to begin execution of a first rate program, and iteratively execute, in response to the signal and during a first time period, a first rate program that (1) includes a first set of pages and not a second set of pages and (2) causes the rate module to send a first number of transmission credits to each rate counter from the set of rate counters per execution iteration of the first rate program. In such embodiments, the rate module can modify the first rate program after the first time period and before a second time period to produce a second rate program including the first set of pages and the second set of pages where the second set of pages is mutually exclusive from the first set of pages. In such embodiments, the rate module can execute during the second time period the second rate program such that the second rate program causes the rate module to send a second number of transmission credits to each rate counter from the set of rate counters per execution iteration of the second rate program. In such embodiments, the first number of transmission credits is different from the second number of transmission credits.

As used in this specification, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "a network node" is intended to mean a single network node or multiple network nodes.

Figure 1:
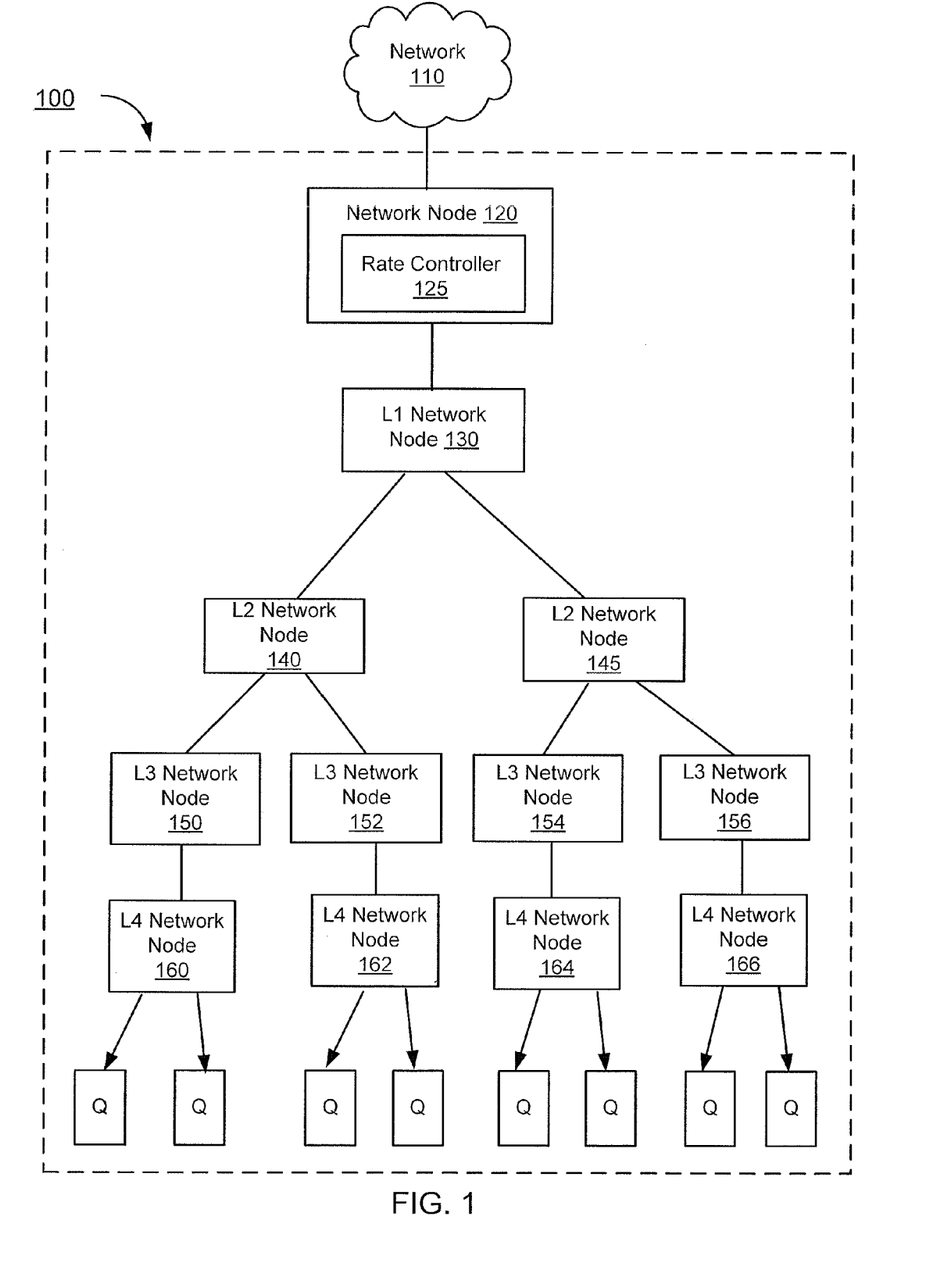
FIG. 1 is a schematic illustration of a hierarchical network, according to an embodiment.

FIG. 1 is a schematic illustration of a hierarchical network, according to an embodiment. The network 100 includes a network node 120, a level 1 (L1) network node 130, level 2 (L2) network nodes 140 and 145, level 3 (L3) network nodes 150-156, level 4 (L4) network nodes 160-166 (as defined by open systems interconnection (OSI) model) and a set of queues (each represented by "Q") associated with a L4 network node. The network 100 can be any type of network (e.g., a local area network (LAN), a wide area network (WAN), a virtual network, and a telecommunications network) implemented as a wired network and/or wireless network and can be operably coupled to any external network 110. The external network 110 can be, for example, a data center network, a wide area network (WAN), the Internet, etc. The network node 120 can be, for example, a compute node, a service node, a router, etc. Each of the network nodes 120, 130, 140, 145, 150-156, 160-166 includes a memory and a processor (not shown in FIG. 1).

The network node 120 can receive from the external network 110 data units (data packets, data cells, etc.) that are addressed to any of the other network nodes in the network 100 as shown in FIG. 1. Additionally, the network node 120 can also send data units from any of the other network nodes (shown in FIG. 1) to the external network 110. In some instances, the network node 120 can perform a variety of operations (e.g., data unit header encapsulation, data unit header decapsulation, etc.) on incoming and/or outgoing data units before sending and/or receiving data units.

Figure 2:
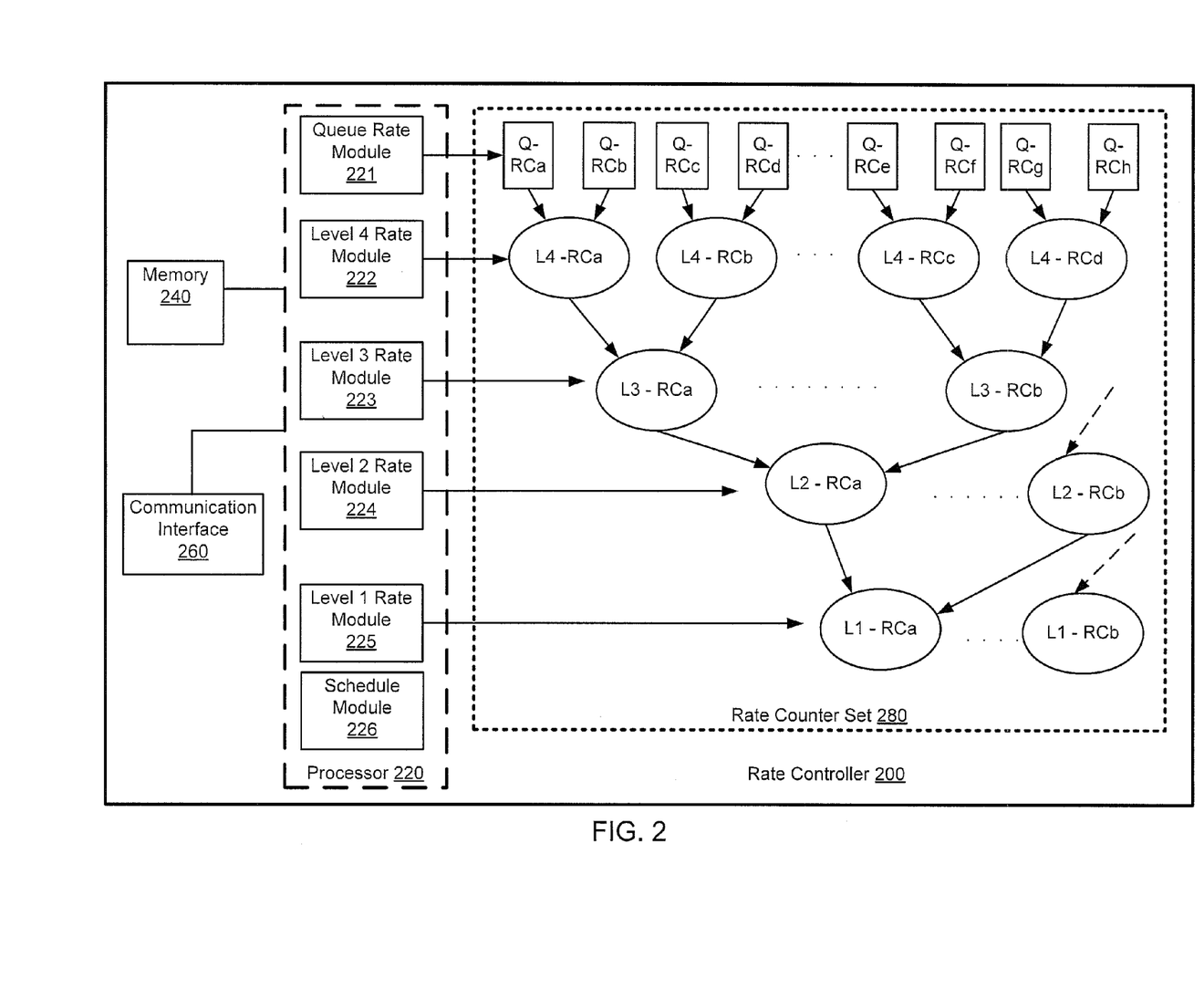
FIG. 2 is a schematic illustration representing the logical organization of a rate controller, according to an embodiment.

The network node 120 includes a rate controller 125 that can be a hardware module and/or software module (stored in memory and/or executed in a processor of the network node 120). In other words, network node 120 can include a processor and a memory (not shown in FIG. 1) within which rate controller 125 can be embodied as a hardware module and/or software module. The rate controller 125 can include or be operatively coupled to a set of rate counters (not shown in FIG. 1). A rate counter can be, for example, a register in either the memory or the processor of the rate controller 125 that can count the number of transmission credits received by the rate controller 125, and can be updated periodically or substantially periodically by the rate controller 125 to reflect the current configuration of the network 100. Each rate counter from the set of rate counters is associated with each network node and/or each queue shown in FIG. 1. The rate controller 125 can include a set of rate modules (not shown in FIG. 1) where each rate module is associated with network nodes in each level from the set of levels shown in the hierarchical network 100. The rate controller 125 can determine the transmission rate of data units within the network 100 and can distribute (or send) transmission credits to the different rate counters associated with the different network devices and/or queues in the network 100 based on the operational configuration of the network 100. The transmission credits can be dynamically sent (or distributed) to the rate counters associated with the network nodes and/or queues and can represent, for example, the amount of bandwidth available for output/input by a network node and/or a queue for the transmission of data. The rate controller 125 can use the dynamically distributed transmission credits to, for example, optimize network performance, improve data unit latency, reduce jitter, and/or increase usable bandwidth for a first set of data units by delaying a second set of data units (where the first set of data units is different from the second set of data units). The rate controller 125 can also compute and associate dynamically clip values for each network device and/or queue of the network 100. The clip values limits the maximum number of transmission credits that each network node rate counter and/or queue rate counter can receive from the rate controller 125. Hence, the clip values prevents the excessive accumulation of transmission credits in a particular network node rate counter and/or a queue rate counter and can limit the data unit burst size from any of the network nodes and/or queues that would otherwise adversely affect the network performance. A detailed description of the logical organization and the function of the rate controller 125 is shown in FIG. 2 and discussed below.

The L1 network node 130 can be, for example, a core network switch that can manage wired/wireless network nodes and/or wired/wireless user sessions within the network 100. In some instances, the L1 network node 130 can forward data units of wired and/or wireless communication sessions between an L2 network node 140 or 145 and the external network 110 that is operatively coupled to the L1 network node 130 (via the network node 120). In some instances, the L1 network node 130 can also initiate and/or establish a wired and/or wireless communication session between L2 network nodes 140 and 145. In other instances, the L1 network node 130 can establish and/or maintain a tunnel for the bi-directional transport of data units from, for example, an L4 network node 160-164 to, for example, the L1 network node 130. Examples of tunnels can include a Multiprotocol Label Switching (MPLS) tunnel, an Ethernet-over-layer-3 tunnel, a Generic Routing Encapsulation (GRE), and/or the like. In some instances, the L1 network node 130 can be referred to as a core SRC (switch, router, and controller).

The L2 network nodes 140 and 145 can be, for example, an aggregation network switch, a digital subscriber line access multiplexer (DSLAM), and/or the like. Specifically, the functionality of the L2 network node 140 and 145 can include multiplexing data traffic, including data units of wired network sessions and data units of wireless network sessions, to the L1 network node 130 by implementing one or multiple local switching and/or forwarding and classification protocols. In some instances, if a tunnel is established between the L3 network nodes 150-156 and the L1 network node 130, L2 network nodes 140 and 145 can forward data units from the L3 network nodes 150-156 to the L1 network node 130 (or vice versa) through the tunnel without implementing local switching or complex forwarding and classification functionality.

The L3 network nodes 150-156 can be any network device that can connect an L4 network node (e.g., any subscriber premise equipment or device) to the network 100. In some instances, the L3 network nodes 150-156 can be any device that connects one or more wired subscriber premise devices to the network 100. In such instances, the L3 network nodes 150-156 can be, for example, a hub, an Ethernet switch, etc. The L3 network nodes 150-156 can be operably coupled to a wired L4 network node 160-166 via a wired connection such as, for example, twisted-pair electrical signaling via electrical cables, fiber-optic signaling via fiber-optic cables, and/or the like. In other instances, the L3 network nodes 150-156 can be any device that connects one or more wireless subscriber premise devices to the network 100. In such instances, the L3 network nodes 150-156 can be, for example, a wireless access point (WAP), and can be operably coupled to a wireless L4 network node 160-166 (e.g., a Wi-Fi enabled laptop, a mobile phone) via a wireless connection such as, for example, a wireless fidelity (Wi-Fi®) connection, a Bluetooth® connection, a cellular connection (e.g., a third generation mobile telecommunications (3G) or a fourth generation mobile telecommunications (4G) connection) and/or the like. More specifically, L3 network nodes 150-156 can forward data units between one or more L4 network nodes 160-166 and the L1 network node 130. Data units sent and/or received by the L3 network nodes 150-156 can include or represent, for example, voice data, textual data, video data, audio data, and/or combinations of the same.

The L4 network nodes 160-166 can be any subscriber premise equipment such as, for example, a web server, an application server, a proxy server, a telnet server, a file transfer protocol (FTP) server, a mail server, a list server, a collaboration server, or a personal computing device such as, for example, a desktop computer, a laptop computer, a personal digital assistant (PDA), a standard mobile telephone, a tablet personal computer (PC), and/or so forth. The L4 network nodes 160-166 can send data units to and/or receive data units from the network 100 and/or the external network 110 via the L3 network nodes 150-156. Each L4 network node 160-166 is associated with one or multiple queues (denoted by "Q" in FIG. 1). A queue has a finite sized location in the memory of the L4 network nodes 160-166 and is a specific data structure where, for example, data units and/or control instructions are stored and held to be processed at a later time. In other words, a queue (Q) is a particular kind of abstract data type in which entities such as data units and/or control instructions are stored in order. In some configurations, the principal operations performed on the queue can be the addition of new entities to the rear terminal position of the queue (known as enqueue), and removal of currently stored entities from the front terminal position of the queue (known as dequeue). In such configurations, a queue can be termed as a First-in-First-Out (FIFO) data structure. Hence, queues (Q's) can perform the function of a buffer and are a part of the memory (not shown in FIG. 1) of the L4 network nodes 160-166.

The rate controller 125 is implemented in the network node 120 of network 100 to control the data traffic from the network node 120 in the downstream direction and match the transmission rate of the data traffic to the speed and/or bandwidth of the interface of the destination network node and/or any intermediate network node. This can increase the likelihood that the data traffic flowing downstream from the network node 120 conforms to the pre-determined or pre-defined data transmission policies for the network 100. Hence, the data units from the network node 120 can adhere to a particular pre-determined profile and can be shaped (i.e., dropped, delayed, etc.) to meet downstream demands or restrictions. This can significantly reduce bottlenecks in network topologies with data rate mismatches (e.g., interface speed of network node 120 is higher than the interface speed of an L2 network node 140). For example, data traffic shaping can avoid congestion that can occur when the speed of the transmitted data from an interface of the network node 120 (e.g., 100 Gbps, 400 Gbps, etc.) exceeds the access speed of the interface of a remote destination device (e.g., a customer premise device with a 100 Mbps interface, a 100 Gbps interface, etc.). In such instances, sending data units at 400 Gbps can cause congestion, data unit loss and ultimately failure of an application executing in the particular communication link. Data traffic shaping can delay the transmission of data units by limiting the number of transmission credits to each intermediate network node and the destination network node along the pathway from the network node 120 to the destination network node. This can increase the likelihood that all the data units transmitted by the network node 120 reaches the destination network node and can minimize data unit loss.

While a specific embodiment of a hierarchical network has been described in FIG. 1, it should be understood that it has been presented by way of example only, and not limitation. In other embodiments, the hierarchical network can include additional level of network devices such as, for example, level-5 (L5) network devices, level-6 (L6) network device, and/or the like. Additionally, in other embodiments, the hierarchical network 100 can include more than one L1 device, more than two L2 network devices, more than four L3 network devices, more than four L-4 network devices, and/or the like.

FIG. 2 is a schematic illustration representing the logical organization of a rate controller, according to an embodiment. The rate controller 200 is similar in functionality to the rate controller 125 shown in FIG. 1. Similar to rate controller 125, the rate controller 200 shown in FIG. 2 can be a hardware module and/or software module stored in memory and/or executed in a processor of a network node. The rate controller 200 includes a processor 220, a memory 240, a communication interface 260, and a set of rate counters 280. The set of rate counters 280 grouped within the dotted box in FIG. 2 are located within the rate controller 200 and includes rate counters associated with the different queues and network nodes of the network. For example, the set of rate counters 280 includes rate counters associated with queues Q-RCa—Q-RCh, rate counters associated with L4 network nodes L4-RCa—L4-RCd, rate counters associated with L3 network nodes L3-RCa—L3-RCb, rate counters associated with L2 network nodes L2-RCa—L2-RCb, and rate counters associated with L1 network nodes L-RCa—L-RCb. The processor 220 includes a queue rate module 221, a level 4 (L4) rate module 222, a level 3 (L3) rate module 223, a level 2 (L2) rate module 224, a level 1 (L1) rate module 225 and a schedule module 226. The processor 220 is operatively coupled to the memory 240 and the communication interface 260. The communication interface 260 of the rate controller 200 can include, for example, one or multiple input/output ports (not shown in FIG. 2) that can be used to implement one or more connections between the rate controller 200 and either other modules within in the network node (e.g., network node 120 shown in FIG. 1) and/or the external network (e.g., external network 110 shown in FIG. 1) and/or a L1 network node (e.g., L1 network node 130 shown in FIG. 1).

As such, the rate controller 200 can be configured to receive data units and/or send data units through one or more ports of the communication interface 260, which is operably coupled to the communication interfaces of the different device and/or modules described above. The communication interface 260 can include one or multiple wired and wireless ports. The wireless port(s) in the communication interface 260 can send and/or receive data units via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol) and/or the like. The wired port(s) in the communication interface 260 can send and/or receive data units via implementing a wired connection between communications interface 260 of the rate controller 200 and the communications interface of the external network and/or the network nodes described above. The wired connection can be, for example, twisted-pair electrical signaling via electrical cables, fiber-optic signaling via fiber-optic cables, and/or the like.

The memory 240 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 240 can store instructions to cause the processor 220 to execute modules, processes and/or functions associated with the rate controller 200. For example, the memory 240 can store "rate update" instructions that can be accessed by the processor 220 to periodically determine the number of transmission credits that can be sent to the rate counters associated with the network nodes and/or queues within the network. Rate update instructions can be stored at, for example, dedicated memory locations in specific rate programs that can include one or multiple linked list of pages of rate update instructions. A given rate program can be associated with either every network node or a subset of network nodes at each level of the hierarchical network (e.g., network 100 in FIG. 1). Additionally, a separate rate program can be associated with either every queue or a subset of queues in the hierarchical network. The organization and execution of a rate program is discussed below in greater detail in connection with FIG. 3.

The different network node and queue rate counters (e.g., labeled in FIG. 2 as Q-RCa—Q-RCh, L4-RCa—L4-RCd, L3-RCa—L3-RCb, L2-RCa—L2-RCb and L1-RCa—L-RCb) can store information associated with the number of times a particular event or process has occurred, for example, in relationship to a rate update period and/or a clock signal. Examples of information that can be represented in the counters can include the number of transmission credits available to a network node rate counter or a queue rate counter in a rate update period, the number of transmission credits consumed by a network node or a queue in a rate update period, the clip value (or maximum number of transmission credits assigned) associated with a network node or a queue in a rate update period, the transmission bandwidth available for every network node and/or queue in a rate update period, the OSI level associated with a network node, and/or the like. In some instances, the different network node rate counters and/or queue rate counters (e.g., labeled in FIG. 2 as Q-RCa—Q-RCh, L4-RCa—L4-RCd, L3-RCa—L3-RCb, L2-RCa—L2-RCb and L1-RCa—L1-RCb) can be hardware counters that can be implemented, for example, using register-type electrical circuits such as flip-flops and/or latches. In such instances, the rate counters can be any type of hardware counters such as, for example, asynchronous counters, synchronous counters, decade counters, up/down counters, ring counters, and/or the like. In other instances, the different network node rate counters and/or queue rate counters (e.g., labeled in FIG. 2 as Q-RCa—Q-RCh, L4-RCa—L4-RCd, L3-RCa—L3-RCb, L2-RCa—L2-RCb and L1-RCa—L1-RCb) can be software counters (stored in the memory 240 and executed in the processor 220). In such instances, a rate counter can be, for example, a register in either the memory 240 or the processor 220 of the rate controller 200, and can be updated by the processor 220 periodically to reflect the current configuration of the network. The rate counters can receive transmission credits from the different rate modules 221-225 based on the rate update instructions included in the different network node rate programs and/or the queue rate programs stored in the memory 240 during a rate update period. A transmission credit can provide an indication or a representation of a rate at which a network device associated with a rate module can transmit data units to other network devices from the set of network devices in the network.

The processor 220 can be, for example, a general purpose processor, a Field Programmable Gate Array (FPGA), an Application Specific Integrated Circuit (ASIC), a Digital Signal Processor (DSP), and/or the like. The processor 220 can be configured to run and/or execute application processes and/or other modules, processes and/or functions associated with the rate controller 200 and/or the network (e.g., network 100 in FIG. 1). The processor 220 includes a queue rate module 221, a level 4 rate module 222, a level 3 rate module 223, a level 2 rate module 224, a level 1 rate module 225 and a schedule module 226.

Although shown as modules within processor 220, the different rate modules (e.g., level 1 rate module 225, level 2 rate module 224, level 3 rate module 223, level 4 rate module 222 and queue rate module 221) can be hardware modules and/or software modules stored in memory 240 and/or executed in the processor 220. The level 1 rate module 225 is operatively coupled to the rate counters associated with each L1 network node in the network (e.g., the rate counters are labeled in FIG. 2 as L1-RCa—L1-RCb). The level 2 rate module 224 is operatively coupled to the rate counters associated with each L2 network node in the network (e.g., the rate counters are labeled in FIG. 2 as L2-RCa—L2-RCb). The level 3 rate module 223 is operatively coupled to the rate counters associated with each L3 network node in the network (e.g., the rate counters are labeled in FIG. 2 as L3-RCa—L3-RCb). The level 4 rate module 222 is operatively coupled to the rate counters associated with each L4 network node in the network (e.g., the rate counters are labeled in FIG. 2 as L4-RCa—L4-RCd). The queue rate module 221 is operatively coupled to the rate counters associated with each queue in the network (e.g., the rate counters are labeled in FIG. 2 as Q-RCa—Q-RCh).

In some instances, a rate module (either all the rate modules or one or more of the rate modules 221-225) can receive from a schedule module 226 a signal to begin execution of a first page of a first rate program. The rate module (221 and/or 222 and/or 223 and/or 224 and/or 225) can send during a first time period and in response to the signal, transmission credits to a first subset of rate counters from the set of rate counters (e.g., Q-RCa—Q-RCh and/or L4-RCa—LA-RCd and/or L3-RCa—L3-RCb and/or L2-RCa—L2-RCb and/or L-RCa—L1-RCb) based on execution of the first page of the first rate program. As described above, each rate program can include one or a set of pages and can be associated with either all the network nodes or a subset of network nodes associated with a specific level in the hierarchical network. The rate module (221 and/or 222 and/or 223 and/or 224 and/or 225) can send during a second time period after the first time period and prior to executing a second page of the first rate program transmission credits to a second subset of rate counters from the set of rate counters (e.g., Q-RCa—Q-RCh and/or L4-RCa—L4-RCd and/or L3-RCa—L3-RCb and/or L2-RCa—L2-RCb and/or L-RCa—L1-RCb) based on the execution of a page of a second rate program. In such instances, the priority of the second rate program is no lower than a priority of the first rate program, and the first subset of rate counters is mutually exclusive from the second subset of rate counters.

Note that the number of transmission credits sent to each rate counter (e.g., Q-RCa—Q-RCh and/or L4-RCa—L4-RCd and/or L3-RCa—L3-RCb and/or L2-RCa—L2-RCb and/or L1-RCa—L1-RCb) from the first subset of rate counters is based on the execution of the first rate program and depends on the number of pages in the first rate program. Similarly, the number of transmission credits sent to each rate counter (e.g., Q-RCa—Q-RCh and/or L4-RCa—L4-RCd and/or L3-RCa—L3-RCb and/or L2-RCa—L2-RCb and/or L-RCa—L1-RCb) from the second subset of rate counters is based on the execution of the second rate program and depends on the number of pages in the second rate program. In some instances, depending on the current state of the network configuration and the data transmission demands placed on the network, either all the rate modules or one or more of the rate modules (e.g., rate modules labeled as 221-225 in FIG. 2) can execute the set of pages of a first rate program and a set of pages of a second rate program in an interleaved manner based on the priority of the first rate program being equal to the priority of the second rate program. In some instances, depending on the number of rate update instructions included in a page of a rate program, the duration of execution of a first rate program can be greater than or less than the duration of executing of a second rate program.

In some instances, depending on the current state of the network configuration and the data transmission demands placed on the network, either all the rate modules or one or more of the rate modules (e.g., rate modules labeled as 221-225 in FIG. 2) can receive from a schedule module 226 a signal to begin execution of a first rate program. In such instances, the rate module (221 and/or 222 and/or 223 and/or 224 and/or 225) can iteratively execute, in response to the signal and during a first time period, the first rate program that includes a first set of pages and not a second set of pages, and can send (based on execution of the first rate program) a first number of transmission credits to each rate counter from the set of rate counters (e.g., Q-RCa—Q-RCh and/or L4-RCa—L4-RCd and/or L3-RCa—L3-RCb and/or L2-RCa—L2-RCb and/or L1-RCa—L1-RCb) per execution iteration of the first rate program. In such instances, the rate module (either all the rate modules or one or more of the rate modules 221-225) can modify the first rate program after the first time period and before a second time period to produce a second rate program including the first set of pages and a second set of pages mutually exclusive from the first set of pages. In such embodiments, the rate module (either all the rate modules or one or more of the rate modules 221-225) can execute during the second time period, the second rate program such that the second rate program causes the rate module to send a second number of transmission credits to each rate counter from the set of rate counters (e.g., Q-RCa—Q-RCh and/or L4-RCa—L4-RCd and/or L3-RCa—L3-RCb and/or L2-RCa—L2-RCb and/or L1-RCa—L1-RCb) per execution iteration of the second rate program. In such embodiments, the first number of transmission credits is different from the second number of transmission credits.

Note that in some instances, one or multiple queue rate program(s) can be executed by the queue rate module 221 on one thread, and one or multiple node rate program(s) can be executed by the either the L4 rate module 222 and/or L3 rate module 223 and/or L2 rate module 224 and/or L1 rate module 225 on a different thread, where a thread is a sequence of programmed instructions that can be managed independently by the processor 220. Hence, rate programs executed on the queue thread do not block rate programs on the node thread and vice-versa (e.g., the queue rate programs cannot block node rate programs when the queue rate module 221 is transmission credit starved). The inverse of the rate update period ($T_{rate}$) multiplied by the value of the transmission credits in each rate update cycle determines the shaping rate of a network node and/or a queue (shaping rate=$1/T_{rate}$×transmission credit value).

Although shown in FIG. 2 as a module in processor 220, the schedule module 226 can be a hardware module and/or software module stored in memory 240 and/or executed in the processor 220. The schedule module 226 can access information associated with the bandwidth of each network node and/or queue in the network (via the communications interface 260) and information associated with transmission credits sent and consumed by each network node and/or queue in the network. The schedule module 226 can also compute the clip value associated with each network node and/or queue in the network based on the current state of the network. The schedule module 226 can also dynamically assign priority levels to each rate program being executed by the different rate modules (i.e., rate modules 221-225). Hence, the schedule module 226 can send a signal to a rate module and alter the order of execution of rate programs on a rate module based on the different priorities of the rate programs. For example, a rate program sending transmission credits to rate counters associated network nodes with higher priority can executed in a rate module (i.e., rate modules 221-225) before a rate program sending transmission credits to rate counters associated with network node with a lower priority based on a signal received from the schedule module 226. Queues and network node rate counters can typically have different number of assigned transmission credits depending on the level in the hierarchy of the network. The schedule module 226 can process the number of transmission credits received and consumed by a rate counter associated with a network node and/or a rate counter associated with a queue in relation to the assigned clip value to a network node and/or a queue to determine when a specific queue and/or a network node is able to transmit and/or receive data units.

Note that the rate modules (e.g., rate modules labeled as 221-225 in FIG. 2) send transmission credits to the different rate counters located in the rate controller 200 that are associated with the different network nodes and/or queues in the network. Additionally, the rate controller 200 can also compute the relevant clip values (e.g., via the rate modules 221-225 and/or the schedule module 226) associated with the different network nodes and/or queues in the network. The transmission credits associated with and/or accumulated for the different network nodes and/or queues in the network in a rate update period and the clip values associated with the different network nodes and/or queues in the network can guide the downstream transmission of data units (e.g., data unit transmission rate, data unit transmission profile, data unit burst size, etc.) from the network node (e.g., network node labeled as 120 in FIG. 1) to the other network nodes (e.g., network nodes labeled as 130, 140, 145, 150-156, 160-166 in FIG. 1) and/or queues (e.g., labeled as "Q" in FIG. 1) in the hierarchical network.

Figure 3:
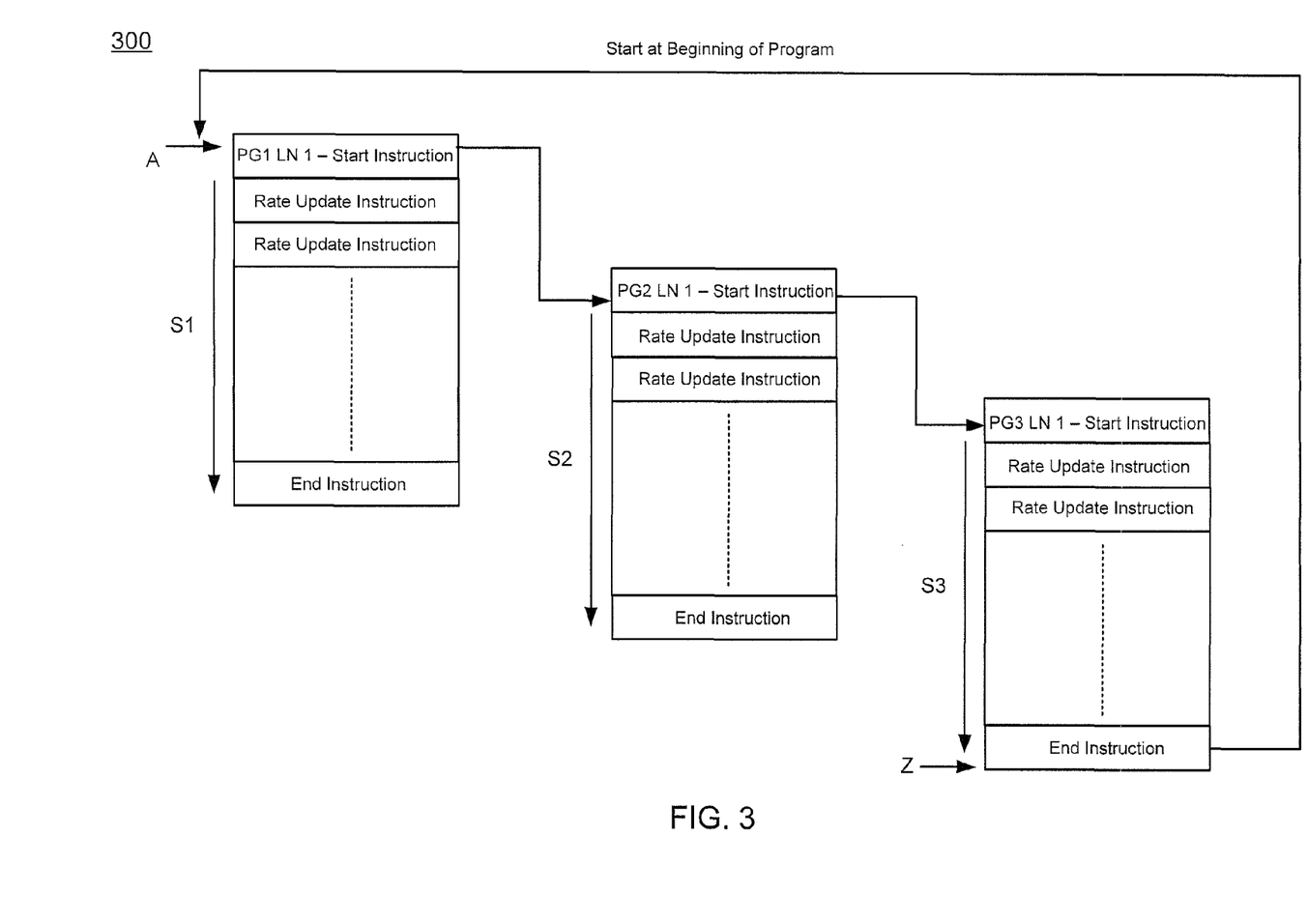
FIG. 3 is a schematic illustration of a rate program with multiple linked pages, according to an embodiment.

FIG. 3 is a schematic illustration of a rate program with multiple linked pages, according to an embodiment. The rate program 300 can either be a queue rate program or a node rate program. The rate program 300 can be stored in the memory of the rate controller, and can be accessed and executed by a rate module (e.g., rate modules labeled as 221-225 in FIG. 2). The rate program 300 shown in FIG. 3 includes three pages (PG 1, PG2 and PG3). Each page is a specific sized memory space that includes rate update instructions that can be stringed together into a linked list (e.g., by a processor). The size of the first page PG1 is S1, the size of the second page PG2 is S2, and the size of third page PG3 is S3. The three pages of the rate program 300 are configured such that the third page PG3 of the rate program is linked to the second page PG2 of the rate program and the first page PG1 of the rate program, the second page PG2 of the rate program is linked to the first page PG1 of the rate program and the third page PG3 of the rate program, and the first page PG1 of the rate program is linked to the second page PG2 of the rate program and the third page PG3 of the rate program. Hence, during an execution iteration of the rate program 300, the first page PG1 of the rate program executes first, followed by the second page PG2 of the rate program that executes after the first page PG1 of the rate program PG1 and before the third page PG3 of the rate program, and finally the third page PG3 of the rate program executes after the second page PG2 of the rate program. Said in another way, during an execution iteration of the rate program 300, PG1 executes first followed by PG2 and PG3. Subsequently, a new iteration of the execution of the rate program 300 can occur by the execution of PG1.

While the specific embodiment of a rate program with three pages has been described above, it should be understood that it has been presented by way of example only, and not limitation. In other embodiments, the rate program can include additional number of pages or less than three pages. Additionally, the pages of the rate program can either be of the same size and contain a fixed number of rate update instructions, or can be of different sizes and contain different number of rate update instructions. The different rate programs executed by a rate module can either have the same pre-determined number of pages or can have different number of pages that addresses the demands of a dynamically changing network configuration. In another example, the rate program can include 1 M (where M=$1\times10^6$) rate update instructions with 1K pages (where K=$1\times10^3$) and each page containing 1K rate update instructions. In another example, an 8K node rate program can include 64 pages with each page containing 128 instructions. Note that network nodes of varying sizes can have associated rate programs of varying page sizes with varying rate update periods. Additionally, in some instances, network nodes and queues at different levels in a hierarchical network (e.g., network 100 in FIG. 1) can have different rate programs with different rate update periods to provide low jitter and latency for network nodes relatively high in the hierarchy (i.e., closer to network node 120 in FIG. 1) or to high priority queues (e.g., queues that are associated voice data traffic).

In some configurations, multiple rate programs can execute in parallel on separate threads, with each thread supporting multiple priority levels. As described above, rate programs (e.g., rate program 300 in FIG. 3) can have different number of rate update instructions, pages, page sizes (e.g., page size S1, S2 and S3 in FIG. 3), priority levels and program timer intervals and/or rate update period. The unit of rate program scheduling in the rate controller (e.g., rate controller 200 in FIG. 2) is an individual program page, so that at each rate update period a single page or multiple pages of a rate program (from a set of rate programs) is selected by the rate controller for execution. Hence, the different pages of a rate program with higher priority level will be executed before the pages of a program with a lower priority level. For example, consider a first rate program with two pages PR1-PG1 and PR1-PG2 associated with a first priority level and a second rate program with one page PR2-PG1 associated with a second priority level greater than the first priority level (e.g., priority level of PR2=2×priority level of PR1). In such instances, the order of execution of the different rate program pages on a single thread will be as follows: PR2-PG1—PR1-PG1—PR2-PG1—PR1-PG2 and repeat. Hence, in such instances, in a given time period, each page of PR2 will execute twice as many times as each page of PR. In other instances, if the priority level of PR1 is the same as the priority level of PR2, the order of execution of the different rate program pages on a single thread will be as follows: PR1-PG1—PR2-PG1—PR1-PG2 and repeat. Hence, in such instances, in a given time period, each rate program will be executed an equal number of times. Said in another way, two or more rate programs with the same priority level can be executed for example, at a rate module, by interleaving pages from each rate program in a round robin manner.

The rate update instructions in each page of the rate program for different kinds of shaping devices (e.g., L1 network node, L2 network node, L3 network node, and queue) can be of different sizes. For example, the rate update instructions for L1 network nodes, L2 network nodes and L3 network nodes can be 16 B in size, the rate update instructions for L4 network nodes and queues can be 8 B in size. The rate update instructions in a page (PG1, PG2 or PG3) of the rate program 300 may be valid (i.e., perform rate updates) or null (i.e., take no action). As the configuration of the network changes, new instructions can be added to a page that has unused entries. Rate instructions in an existing page of the rate program 300 may not undergo modifications when new instructions and/or pages are added to the rate program 300. In the event where new no pages exist in a rate program with unused entries, new pages can be added to the rate program 300 by linking a new page to the last page of the rate program 300. Additionally, as rate update instructions are deleted from the rate program (e.g., by a rate module), the rate controller (e.g., rate controller 200 in FIG. 2) can either compact the pages of a rate program 300 and/or delete a page from the tail of the rate program 300 or from the middle of the rate program 300.

As shown in FIG. 3, the rate program 300 can be segmented into fixed and configurable sized pages for ease of execution (e.g., PG1 with size S1, PG2 with size S2, and PG2 with size S3) that can account for priority level preference and increase the likelihood of "fair" execution for rate programs at similar priority levels (e.g., pages of rate programs can be interleaved in a round-robin fashion per priority level). The different pages of the rate program (e.g., PG1, PG2 and PG3) can be linked together to form a linked list using, for example, a "Next Address" that is stored in the "Start Instruction" of each page and/or the "End Instruction" of each page (FIG. 3 shows the former instance). A rate program 300 can have a starting address (e.g., address "A" in FIG. 3) and an ending address (e.g., address "Z" in FIG. 3) that are framing instructions that delineate page program boundaries in the memory. A "Start Instruction" is typically located at the beginning of each page of the rate program 300, while an "End Instruction" is located at the end of each page of the rate program 300 (as shown in FIG. 3). This configuration of a rate program 300 allows, for example, for the processor (or rate module) to detect if a rate program 300 starts executing at an incorrect location in memory and/or a rate program 300 ends execution at an incorrect location in memory. The "Start Instruction" is typically defined with a value of 0x7FFF_FFFF in the upper 32-bits or most significant 32-bits (e.g., for a 64-bit rate program). The lower 32-bits can include, for example, a Valid Next Pointer bit (bit 31) and a Next Address in the lower 21-bits. When an entry in a page of the rate program 300 is cleared by the rate controller, the entry represents a value of 0x0000_0000_0000_0000. The rate controller typically can clear the upper 32-bits of a rate update instruction when invalidating (i.e., not clearing a memory location) an instruction (e.g., 0x0000_0000 xxxx_xxxx) and the "End Instruction" is typically coded as 0x7FFF_FFFF_xxxx_xxxx. The "Start Instruction" entry and the "End Instruction" entry are typically checked by a rate module at each page boundary and an error message can be generated if the expected values at the "Start Instruction" and "End Instruction" entries are not found. A rate program 300 can have a timer associated with a pre-determined programmable timer period that can determine when a page of a rate program should be executed by, for example, a rate module in the processor of the rate controller. For example, the timer can include a Present Time entry and a Next Time entry that can indicate when a page of the rate program should be executed.

Figure 4:
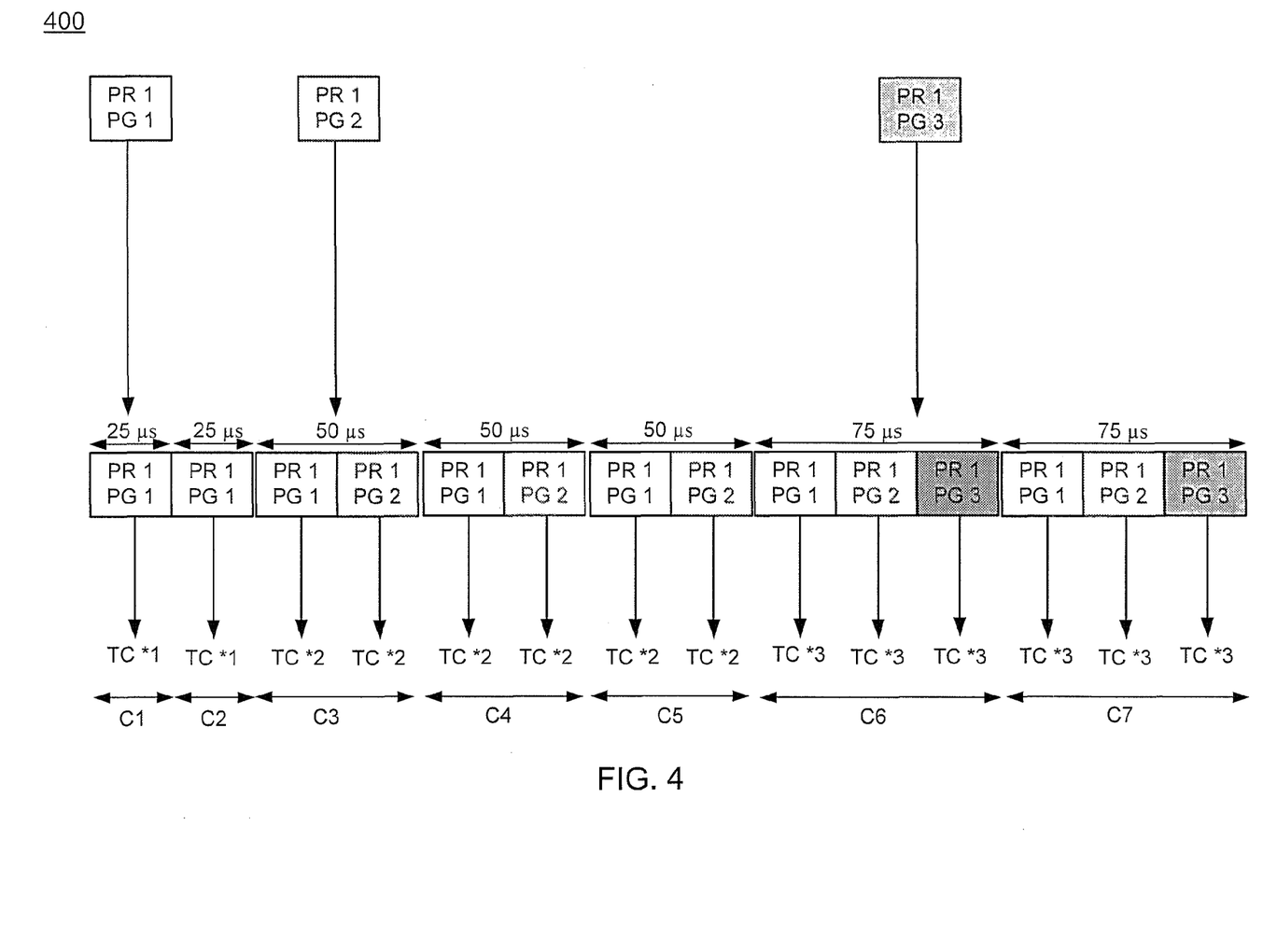
FIG. 4 is a schematic illustration of an example of a rate program being executed on a processing thread that includes dynamic addition of pages to the rate program during execution, according to an embodiment.

FIG. 4 is a schematic illustration of an example of a rate program being executed on a processing thread that includes dynamic addition of pages to the rate program during execution, according to an embodiment. Pages and instructions in a rate program are accessed, for example, by a rate module, at a timer interval that determines the rate update period. As described above, multiple rate programs can be executed (sequentially or in parallel) on the same thread or different rate programs can be executed on separate threads. In the example shown in FIG. 4, in a first configuration, the rate controller executes a rate program (PR1) with one page (PG1) in the first rate update cycle (C1). The first page (PR1 PG1) is defined and executed with a time period of 25 is in the first rate update cycle (C1). With a single page (PG1) included in the rate program (PR1), the transmission credits (TC) sent to a set of rate counters associated with the network nodes and/or queues are not scaled, or scaled by one, and reflect the transmission credit values in the rate update instructions of the rate program (PR1). In such a configuration, the Next Address in the Start Instruction of the PG1 points to itself, such that PG1 is executed again in the second rate update cycle (C2) with a rate update period of 25 pts. When a second page of rate update instructions (PG2) is added to the rate program (PR1) during the third rate update cycle (C3), the Next Address in the PG1 Start Instruction is updated (e.g., by the rate module) to point to the second page of the rate program (PG2). In such instances, each page of the rate program (PG1 and PG2) executes every 25 µs and the rate update period for the rate program is 50 µs. To compensate for the rate update period increase due to the addition of the second page (PG2), the transmission credits are scaled by a factor of two (TC*2) in the third rate update cycle (C3). As described above, the shaped node rate or queue rate can be defined as: (1/rate update period)*(value of transmission credits). In such instances, the number of transmission credits sent by each page of the rate program is scaled to compensate for the longer rate update period and thus the shaped (node or queue) rate is kept constant. In such instances, the Next Address in the Start Instruction of the PG1 points to the Start Instruction of PG2, and thus PG1 and PG2 are executed sequentially during the fourth rate update cycle (C4) and the fifth rate update cycle (C5). When a third page of rate update instructions (PG3) is added to the rate program (PR1) during the sixth rate update cycle (C6), the Next Address in the PG2 Start Instruction is updated (e.g., by the rate module) to point to the third page of the rate program (PG3). In such instances, each page of the rate program (PG1, PG2 and PG3) executes every 25 s and the rate update period for the rate program is 75 its. To compensate for the rate update period increase due to the addition of the third page (PG3), the transmission credits are scaled by a factor of three (TC*3) in the sixth rate update cycle (C6). In such instances, the number of transmission credits sent by each page of the rate program (to the different rate counters) is scaled by a factor of three to compensate for the longer rate update period (three-fold) and thus the shaped (node or queue) rate is kept constant. Note that in such instances, the clip value assigned to network node and/or a queue by the rate program may also be scaled to equal the transmission credits in cases where the scaled transmission credit value is larger than the initial programmed or pre-determined clip value.

The rate controller discussed in FIGS. 1-4 can define and execute different rate programs that can dynamically change rate update periods based on the configuration of the network, where rate update periods are relatively shorter in smaller network configurations and relatively longer in larger network configurations. Multiplication of transmission credits to account for longer rate update periods can be performed at, for example, the processor of the rate controller (e.g., processor 220 in FIG. 2) to scale the value of the transmission credits stored in the rate update instruction of each page of the rate program (the clip value can be scaled at the processor of the rate controller as desired because the clip value>=transmission credit value). For example, in some configurations, a rate program can include a single page with a rate update period of 1 Cps (i.e., the page of the rate program is executed every 1 s) and with each transmission credit having a value of 5 credits. In such configurations, rate program can produce 1 M (where M=1×10$^6$) rate updates every second and with transmission credit rate of 5 Mps. In such configurations, when a second page is added to the rate program, each page of the rate program is executed half as often during a fixed time period. In this configuration, each page of the rate program is executed every 1 μs (i.e., rate update period for the rate program is 2 μs). Hence, each transmission credit for the rate program is multiplied by a factor of 2 to generate transmission credit value of 10 per rate update instruction per page. This produces 500 K (where K=1×10$^3$) rate updates per page every second and with transmission credit rate of 5 Mps. Thus, the transmission credit rate can be maintained at the same or similar value even as page(s) are added or removed from a rate program.

Figure 5:
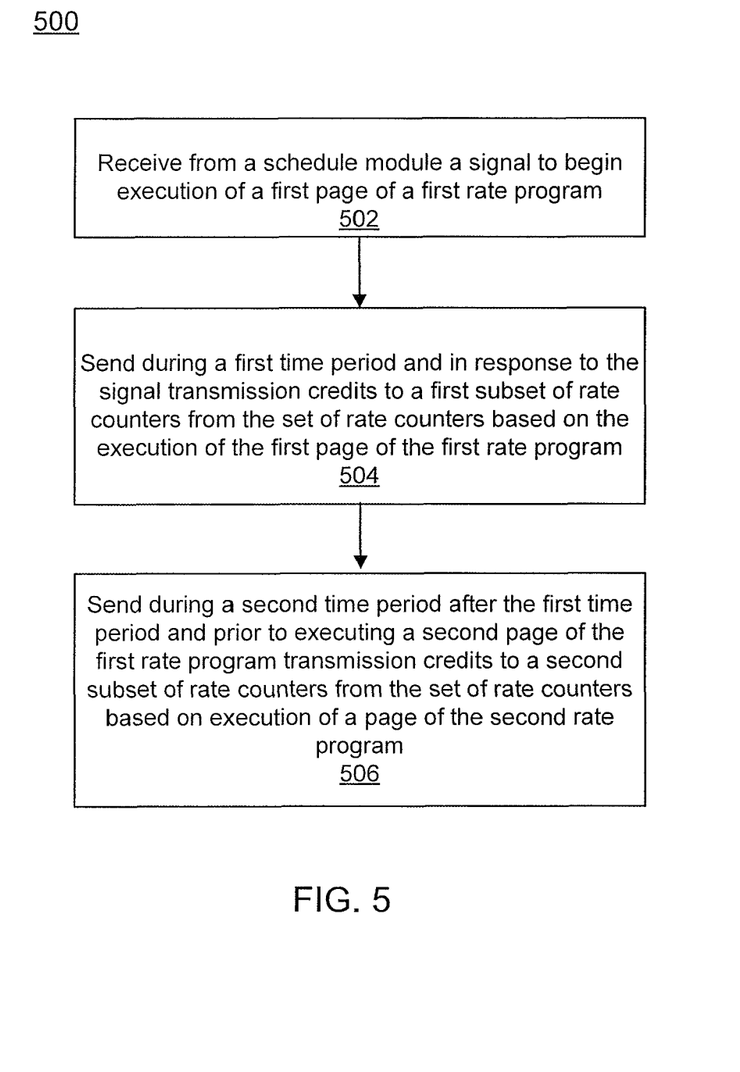
FIG. 5 is a flow chart illustrating a method of sending transmission credits to node and/or queue rate counters, according to an embodiment.

FIG. 5 is a flow chart illustrating a method of sending transmission credits to node and/or queue rate counters, according to an embodiment. The method 500 includes receiving from a schedule module a signal to begin execution of a first page of the first rate program, at 502. The signal sent from the schedule module can be received at, for example, a rate module, where a rate module can be a hardware module and/or a software modules stored in the memory and/or executed in the processor of a rate controller. As described above, a rate module can be operatively coupled to rate counters associated with a set or a subset of network nodes and/or queues associated with a level from a set of levels within a hierarchical network. As described above, a schedule module can be a hardware module and/or a software module stored in the memory and/or executed in the processor of the rate controller. As described above, the schedule module can access information associated with the bandwidth of each network node and queue in the hierarchical network and/or can access information associated with transmission credits sent to the rate counters of each network node and queue in the network and/or can access information associated with the transmission credits consumed by each network node and queue in the network. As described above, the schedule module can also compute the clip amount associated with each network node and/or queue in the network based on the configuration of the network.

At 504, transmission credits are sent by, for example, the rate module to a first subset of rate counters from the set of rate counters during a first time period based on the execution of the first page of the first rate program and in response to the signal received from the schedule module. As described above, the transmission credits can be dynamically sent by, for example, the rate controller to the network node rate counters and/or queue rate counters and can represent, for example, the amount of bandwidth available to a network node and/or a queue for the transmission of data units. The dynamically distributed transmission credits can be used by, for example, the rate controller to optimize network performance, improve data unit latency, reduce jitter, and/or increase usable bandwidth for, for example, a first kind of data units (e.g., voice data) by delaying other kinds of data units (e.g., textual data).

At 506, transmission credits are sent by, for example, the rate module to a second subset of rate counters from the set of rate counters based on execution of a page of a second rate program during a second time period after the first time period and prior to execution of a second page of the first rate program. As described above, the rate counters can be associated with different network nodes and/or queues of the hierarchical network. As described above, a queue is finite sized location in the memory of the network nodes and is a specific data structure where various entities such as data units and/or control instructions are stored and held to be processed at a later time. Hence, queues can perform the function of a buffer and are a part of the memory of the network nodes.

Figure 6:
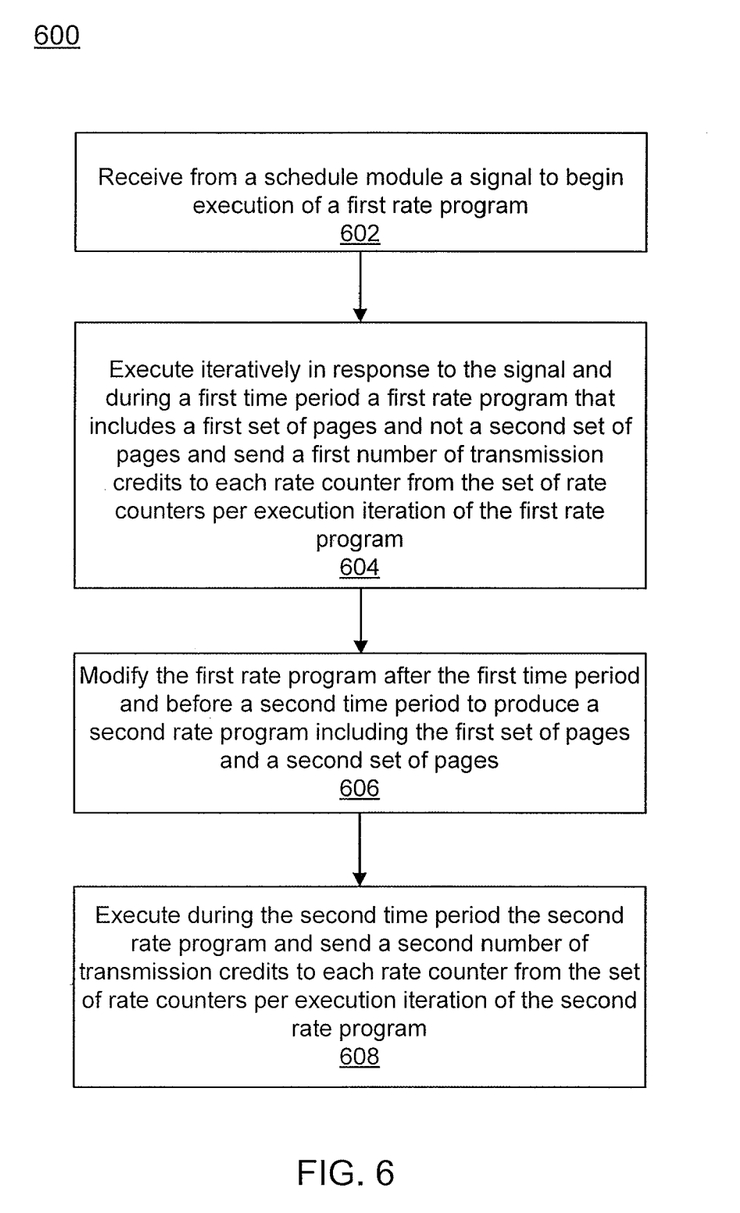
FIG. 6 is a flow chart illustrating a method of sending transmission credits to node and/or queue rate counters, according to another embodiment.

FIG. 6 is a flow chart illustrating a method of sending transmission credits to node and/or queue rate counters, according to another embodiment. The method 600 includes receiving from a schedule module a signal to begin execution of a first rate program, at 602. The signal sent from the schedule module can be received at, for example, a rate module, where a rate module can be a hardware module and/or a software module stored in the memory and/or executed in the processor of a rate controller.

At 604, the first rate program that includes a first set of pages and not a second set of pages is executed iteratively for example, at a rate module, in response to the signal during a first time period and a first number of transmission credits are sent to each rate counter from the set of rate counters per execution iteration of the first rate program. As described above, each execution iteration of the first rate program is equivalent to the time period of a rate update cycle and is related to the number of pages in the first rate program and the number of rate update instructions in each page of the first rate program. As described above, the rate counters can be associated with the set or a subset of network nodes and queues of a hierarchical network. As described above, in some instances, the different network node rate counters and the queue rate counters can be hardware counters that can be implemented, for example, using register-type electrical circuits such as flip-flops and/or latches. In such instances, the rate counters can be any type of hardware counters such as, for example, asynchronous counters, synchronous counters, decade counters, up/down counters, ring counters, and/or the like. As described above, in other instances, the different network node and queue rate counters can be software counters (stored in the memory and executed in the processor of the rate controller). In such instances, the rate counter can be, for example, a register in either the memory or the processor of the rate controller and can be updated by the processor periodically to reflect the dynamically changing configuration of the network. As described above, the rate counters can receive transmission credits from the different rate modules based on the rate update instructions included in the different network node rate programs and/or the queue rate programs stored in the memory of the rate controller during every rate update period. As described above, a transmission credit can provide, for example, an indication or a representation of a rate at which a network node associated with a rate module can transmit data units to other network nodes from the set of network nodes in the network.

At 606, the first rate program is modified at, for example, the rate module after the first time period and before a second time period to produce a second rate program including the first set of pages and a second set of pages. In such configurations, the second set of pages is linked to the first set of pages by for example, the rate module. As described above, the different pages of the rate program are linked together to form a linked list using, for example, a "Next Address" that is stored in the "Start Instruction" of each page and/or the "End Instruction" of each page. As described above, a "Start Instruction" is typically located at the beginning of each page of the rate program, while an "End Instruction" is located at the end of each page of the rate program.

At 608, the second rate program is executed during a second time period and a second number of transmission credits is sent to each rate counter from the set of rate counters per execution iteration of the second rate program. In such configurations, the first number of transmission credits generated from executing the first rate program is different from the second number of transmission credits generated by executing the second rate program. This is because the second rate program has the first set of pages and the second set of pages and the first rate program has only the first set of pages. Additionally, the rate update period for the second rate period is greater than the rate update period of the first rate program.

The methods of implementing a dynamic rate controller in the network that defines and executes the different kinds of rate programs as described in FIGS. 1-6 can allow, for example, for execution of linked list of pages of rate program(s) and allow dynamic scaling of transmission credits and clips values for each network node and/or each queue in a hierarchical network. In such methods, the network operating system is relieved of the task of having to compute new transmission credit and clip values for each network node and queue in existing rate update instructions as the rate update period changes due to network configuration changes (e.g., additional of new network nodes, removal of existing network nodes, etc.). In such methods, the rate modules in the rate controller can add and/or delete pages in the rate program and can change (or modify) the scale factor of the transmission credits (as shown in FIG. 4) based on the number of pages in the rate program. This approach can be memory efficient because no additional memory (e.g., the double memory often found in known methods) is needed because the rate update instructions can be present once in the rate update program irrespective of the rate update period. The rate programs executed in the rate modules of the rate controller can be constructed from one or more pages that are connected by a linked list. Such pages can include a "Next Address" that can point to the next page in the linked list (last page can point to a subsequent page or the same page if only one page is present in a rate program).

In such methods, new pages in a rate program can be added to the tail (or the last page) of the rate program and existing pages can be deleted from the tail or the middle of the rate program as the configuration of the network changes. The pages of the rate program can either be of the same size and contain a fixed number of rate update instructions, or can be of different sizes and contain different number of rate update instructions. The different rate programs can either have the same pre-determined number of pages or can have different number of pages that addresses the demands of a dynamically changing network configuration. The rate programs can also be defined (by the rate controller) for different levels of a hierarchical network or within a specific level to minimize network latency and jitter.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:
1. An apparatus, comprising:
a memory; and a processor coupled to the memory, the processor configured to be coupled to a plurality of rate counters, each rate counter from the plurality of rate counters being associated with a different network device from a plurality of network devices associated with a level from a plurality of levels within a hierarchy of a network, the processor configured to begin execution of a first page of a first rate program, the first rate program including a linked list of a plurality of pages;

the processor configured to send, during a first time period and in response to the execution, transmission credits to a first subset of rate counters from the plurality of rate counters based on execution of the first page of the first rate program, the processor configured to send, during a second time period after the first time period and prior to executing a second page of the linked list of the plurality of pages of the first rate program, transmission credits to a second subset of rate counters from the plurality of rate counters based on execution of a page of a second rate program and based on a priority of the second rate program being no lower than a priority of the first rate program, the second rate program including a linked list of a plurality of pages, the first subset of rate counters being mutually exclusive from the second subset of rate counters.

2. The apparatus of claim 1, wherein
the processor configured to execute the plurality of pages of the first rate program and the plurality of pages of the second rate program in an interleaved manner based on the priority of the first rate program being equal to the priority of the second rate program.

3. The apparatus of claim 1, wherein the processor is configured to begin execution of the page of the second rate program after the first page of the first rate program completes execution.

4. The apparatus of claim 1, wherein a number of transmission credits sent to each rate counter from the first subset of rate counters based on execution of the first rate program depends on a number of pages in the first rate program.

5. The apparatus of claim 1, wherein the level from the plurality of levels is associated with at least one of a subscriber premise equipment, a digital subscriber line access multiplexer (DSLAM), an aggregation switch, or a core switch.

6. The apparatus of claim 1, wherein the transmission credits provide an indication of a rate at which a network device associated with the processor can transmit data to each network device from the plurality of network devices.

7. The apparatus of claim 1, wherein the second page of the first rate program is linked to the first page of the first rate program such that during an execution iteration of the first rate program the second page executes after the first page.

8. A non-transitory processor-readable medium storing code representing instructions to be executed by a processor, the code, when executed, causing the processor to:

begin iterative execution of a first rate program, the first rate program including a first linked set of pages, the processor coupled to a plurality of rate counters, each rate counter from the plurality of rate counters being associated with a different network device from a plurality of network devices;

send, based on the iterative execution of the first rate program, a first number of transmission credits to each rate counter from the plurality of rate counters per execution iteration of the first rate program during a first time period, each page from the first linked set of pages being directly linked to a previous page from the first set of pages and a subsequent page from the first set of pages such that a page from the first set of pages executes after its previous page and prior to its subsequent page;

modify, after the first time period and before a second time period, the first rate program to produce a second rate program including the first linked set of pages and a second linked set of pages, the second linked set of pages being mutually exclusive from the first linked set of pages;

send, based on execution of the second rate program, a second number of transmission credits to each rate counter from the plurality of rate counters per execution iteration of the second rate program, the first number of transmission credits being different from the second number of transmission credits.

9. The non-transitory processor-readable medium of claim 8, wherein a duration of an execution iteration of the first rate program is less than a duration of an execution iteration of the second rate program.

10. The non-transitory processor-readable medium of claim 8, wherein each network device from the plurality of network devices is associated with a level from a plurality of levels within a hierarchy of a network.

11. The non-transitory processor-readable medium of claim 8, wherein each network device from the plurality of network devices is associated with at least one of a subscriber premise equipment, a digital subscriber line access multiplexer (DSLAM), an aggregation switch, or a core switch.

12. The non-transitory processor-readable medium of claim 8, wherein the transmission credits provide an indication of a rate at which a network device associated with the processor can transmit data to each network device from the plurality of network devices.

13. The non-transitory processor-readable medium of claim 8, wherein a rate at which transmission credits are sent to the plurality of rate counters based on iterative execution of the first rate program is equal to a rate at which transmission credits are sent to the plurality of rate counters based on iterative execution of the second rate program.

14. An apparatus, comprising:
a memory; and
a processor coupled to the memory, the processor configured to be coupled to a plurality of rate counters, each rate counter from the plurality of rate counters being associated with a different network device from a plurality of network devices, the processor configured to iteratively execute, during a first time period, a first rate program that (1) includes a first linked set of pages and not a second linked set of pages and (2) causes the processor to send a first number of transmission credits to each rate counter from the plurality of rate counters per execution iteration of the first rate program, each page from the first linked set of pages being directly linked to a previous page from the first linked set of pages and a subsequent page from the first linked set of pages such that a page from the first linked set of pages executes after its previous page and prior to its subsequent page;

the processor configured to modify the first rate program after the first time period and before a second time period to produce a second rate program including the first linked set of pages and the second linked set of pages, the second linked set of pages being mutually exclusive from the first linked set of pages, the processor configured to execute, during the second time period, the second rate program such that the second rate program causes the processor to send a second number of transmission credits to each rate counter from the plurality of rate counters per execution iteration of the second rate program, the first number of transmission credits being different from the second number of transmission credits.

15. The apparatus of claim 14, wherein a duration of an execution iteration of the first rate program is less than a duration of an execution iteration of the second rate program.

16. The apparatus of claim 14, wherein each network device from the plurality of network devices is associated with a level from a plurality of levels within a hierarchy of a network.

17. The apparatus of claim 14, wherein each network device from the plurality of network devices is associated with at least one of a subscriber premise equipment, a digital subscriber line access multiplexer (DSLAM), an aggregation switch, or a core switch.

18. The apparatus of claim 14, wherein the transmission credits provide an indication of a rate at which a network device associated with the processor can transmit data to each network device from the plurality of network devices.

19. The apparatus of claim 14, wherein a rate at which transmission credits are sent to the plurality of rate counters based on the first rate program is equal to a rate at which transmission credits are sent to the plurality of rate counters based on the second rate program.

\* \* \* \* \*